E. C. GLEDHILL.
DRAG ATTACHMENT.
APPLICATION FILED APR. 21, 1911.
1,039,381.
Patented Sept. 24, 1912.
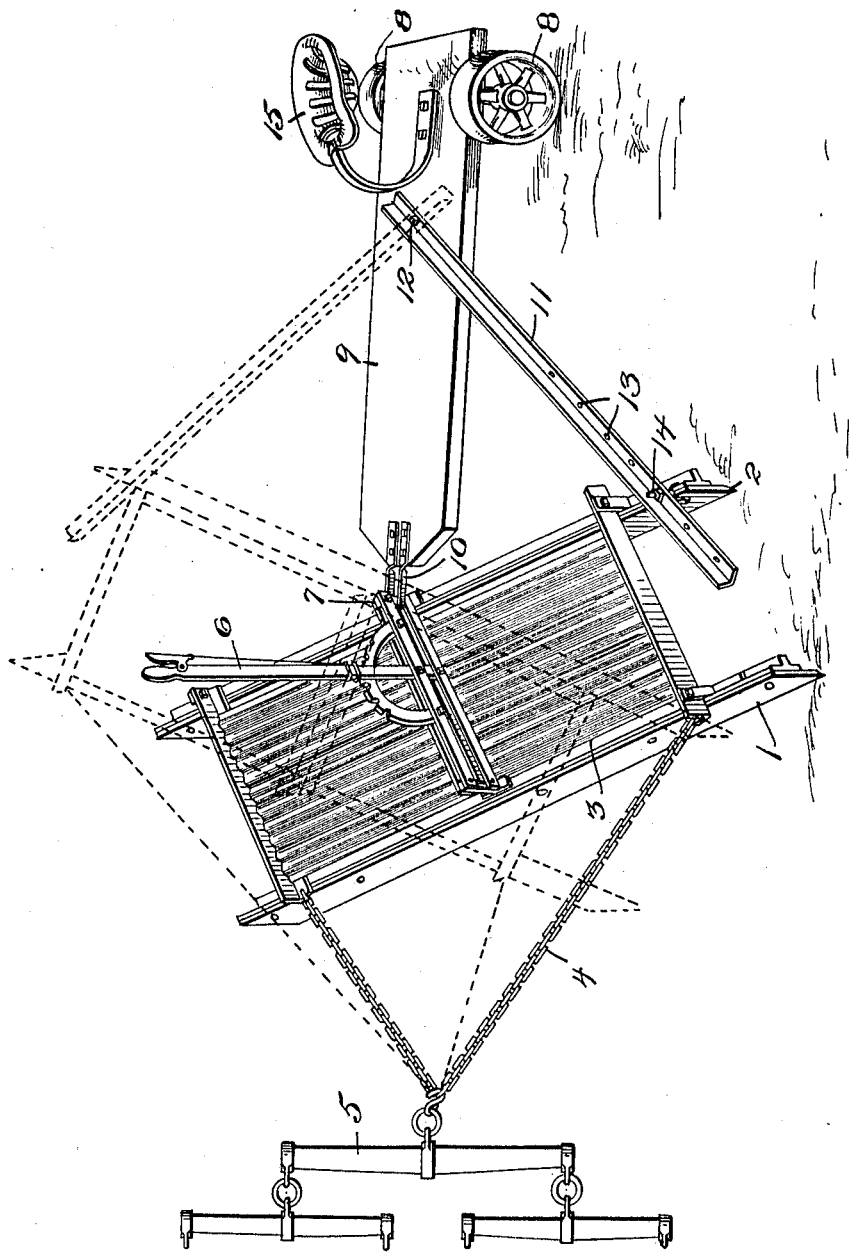

UNITED STATES PATENT OFFICE.

EDWARD C. GLEDHILL, OF GALION, OHIO, ASSIGNOR TO GALION IRON WORKS COMPANY, OF GALION, OHIO.

DRAG ATTACHMENT.

1,039,381.     Specification of Letters Patent.     Patented Sept. 24, 1912.

Application filed April 21, 1911. Serial No. 622,604.

*To all whom it may concern:*

Be it known that I, EDWARD C. GLEDHILL, a citizen of the United States, residing at Galion, in the county of Crawford and State of Ohio, have invented certain new and useful Improvements in Drag Attachments, of which the following is a specification.

This invention comprehends certain new and useful improvements in road scrapers or leveling devices, and relates particularly to drags.

To those versed in the art of building or maintaining and repairing roads it is well known that when drag scrapers are used and are drawn along the road with the scraping blade or blades at an oblique angle to the line of travel to allow the dirt to escape or to be shed from one side of the blades, it sometimes happens that the pressure of the dirt in front of the blades becomes sufficient to cause the drag to skid, or move sidewise.

With a knowledge of these conditions, the primary object of this invention is to overcome this skidding in a simple and efficient manner, and the invention consists essentially in an improved attachment for drags, capable of being attached to any of the ordinary or conventional forms of drag scrapers and so constructed and arranged that it will effectually prevent the drag from moving sidewise on account of the pressure of dirt on the blades, the drag being at all times kept up to the draft. And the invention also consists in certain constructions, arrangements and combinations of the parts that I shall hereinafter fully describe and claim.

For a full understanding of the invention reference is to be had to the following description and accompanying drawings, in which the figure is a perspective view illustrating the invention.

The drag scraper shown in the drawing is simply selected for the purpose of illustration, and embodies front and rear scraping blades 1 and 2, a platform 3, a draft chain 4 to which the whiffle-tree 5 is connected, and a hand lever 6 which is so connected to the blades that the latter may be adjusted to different inclinations so as to vary their pitch. The adjusting mechanism also includes in the present instance a rear actuating arm 7.
My improved drag attachment embodies a pair of ground wheels 8 journaled on the opposite sides of a platform 9 of any desired construction and design, preferably at the rear end of the platform. The forward end of the platform is provided with a coupling 10 in the form of a looped metallic strap bolted or otherwise secured thereto and designed to loosely encircle and engage the rear actuating arm 7 whereby to pivotally connect the attachment to the drag at the middle of the latter. A single brace 11, which in the present instance is in the form of an angle bar, is pivotally connected at its rear end, as at 12, to the upper face of the platform 9, said brace being formed with any desired number of apertures 13 arranged in a longitudinally extending series, any one of which is designed to receive a shank of a clip 14 held therein in any desired way, the clip being designed to detachably connect the forward end of the brace 11 to the drag, either at the right or left hand thereof, being preferably attached to the end of the rear blade 2, as illustrated in the drawings. The platform 9 also provides a place for a driver's seat, as indicated at 15.

From the foregoing description in connection with the accompanying drawings the operation of my improved drag attachment will be apparent.

The attachment will manifestly, in the practical use of the device, be maintained by its ground wheels 8 directly in the line of travel, and consequently the drag attachment is connected to the brace 11 at one end or the other, according to the slant desired and to the particular requirements of the case, as for instance whether it be desired to make a right or a left hand cut. After the parts have been properly adjusted and the drag is drawn along the road, it is manifest that as the attachment of my invention is connected to the drag directly in line with the draft, it will effectively keep the drag up to its work and prevent any skidding or undue sidewise movement.

The brace 11 is not for the purpose of supporting the road drag at an angle to the platform 9 as this angular position of the drag and scrapers is secured by adjusting the draft device 5 along the chain 4. It will be obvious that without the brace 11, the attachment including the platform 9 and its ground engaging devices 8 would track, but without the brace or bar 11, the attachment would not accomplish the purpose desired. Namely, it would not hold the scraper from any sidewise movement because of the pivotal connection between the platform and the drag, and because any sidewise movement of the drag frame would not be transmitted to the rear end of the platform 9. The bar 11 therefore constitutes a means whereby any lateral draft or pressure on the drag frame will be transmitted directly to the rear end of the platform and hence will tend to force the ground engaging devices, that is, the wheels 8, laterally. This is resisted by the fact that the wheels 8 engage with the ground and can not easily slide laterally. It will be seen that the force exerted on the bar or brace 11 will be transmitted almost directly to the wheels whereas if the brace or bar 11 was omitted, the wheels 8 would only slightly resist any sidewise movement of the drag. This angular bar or brace 11 meets or takes the side pressure and transfers it to the platform 9, which in turn is held in position by the wheels 8 or other ground engaging devices at the rear end of the platform. These ground engaging devices have the same effect as a landside on a plow and hold the drag right up to the work and to the direct line of draft.

It will be seen that with the construction illustrated in the drawings the draw link is placed to the right of the center of the draw chain, and that with the team hitched to this draw link, the right hand side of the drag will be pulled forward in advance of the left hand side. This makes the proper cutting slant and the material shaved from the surface of the road will naturally "float off" at the left hand side of the drag which is the rear end. It frequently occurs, however, that a considerable amount of material will accumulate in front of both blades, thus causing back pressure, and whenever this back pressure from this material which is being freshly cut is greater than the weight of the machine, the drag will skid to the right sidewise, and instead of maintaining a straight line course, the machine will skid into the right hand ditch. It is this sidewise pressure that is overcome by the attachment described.

Having thus described the invention, what is claimed as new is:

1. The combination with a road drag including a frame, a transversely extending blade mounted thereon and draft devices connected to the frame, of a drag attachment comprising a relatively elongated platform having ground engaging devices at its rear end, the forward end of the platform being provided with a clip loosely engaging the drag frame at its middle to permit free pivotal movement of the platform relative to the frame, and a pressure transmitting bar pivoted at one end adjacent the rear end of the platform and at its other end provided with a clip engaging the frame, said bar being adjustable relative to the clip.

2. The combination with a road drag including a frame, a blade extending transversely of the frame and draft attachments connected to the frame to hold the frame and blade at an angle to the line of draft, of a non-skidding attachment therefor including an elongated platform, ground engaging devices mounted at the rear end of the platform, a seat mounted upon the rear end of the platform, a coupling pivotally connecting the forward end of the platform to the frame at the middle thereof and directly opposite the point of application of the draft devices, and a pressure transmitting bar pivoted at one end to the platform adjacent the rear end thereof, and pivotally connected at its forward end to one end of said frame.

In testimony whereof, I affix my signature in presence of two witnesses.

EDWARD C. GLEDHILL. [L. S.]

Witnesses:
    L. M. LIGGETT,
    CHAS. L. SEELEY.

---

Copies of this patent may be obtained for five cents each, by addressing the "Commissioner of Patents, Washington, D. C."